United States Patent [19]

Allshouse et al.

[11] Patent Number: 5,691,636
[45] Date of Patent: Nov. 25, 1997

[54] PROBE ASSEMBLY MOUNTING FOR A GRINDING MACHINE

[75] Inventors: Gary W. Allshouse, Muncy; James E. Cawthern, Jr., Linden, both of Pa.; Randall K. Hopkins, Milford, Mass.

[73] Assignee: Andritz Sprout-Bauer, Inc., Muncy, Pa.

[21] Appl. No.: 111,996

[22] Filed: Aug. 25, 1993

[51] Int. Cl.⁶ .................................................. G01B 7/14
[52] U.S. Cl. ........................... 324/207.15; 324/207.26; 324/229; 241/37; 336/65; 336/90
[58] Field of Search ..................... 324/71.1, 173, 324/174, 207.15, 226, 227, 229–232, 207.26, 262, 239; 162/261; 241/37; 336/30, 65, 90; 73/660, 661, 7

[56] References Cited

U.S. PATENT DOCUMENTS

| | | | |
|---|---|---|---|
| 2,548,599 | 4/1951 | Garr | 241/37 |
| 2,921,298 | 1/1960 | Jackson | 340/870.35 |
| 2,978,599 | 4/1961 | Wilcox | 310/168 |
| 3,434,670 | 3/1969 | May | 241/37 |
| 3,488,581 | 1/1970 | Foster | 324/662 |
| 3,500,179 | 3/1970 | May | 324/207.12 |
| 3,539,912 | 11/1970 | Wardle | 324/207.24 |
| 3,932,941 | 1/1976 | Ormsby | 73/7 |
| 4,073,442 | 2/1978 | Virving | 241/37 |
| 4,387,339 | 6/1983 | Akerblom | 324/207.18 |
| 4,418,574 | 12/1983 | Flournoy | 324/220 X |
| 4,669,310 | 6/1987 | Lester | 73/597 |
| 4,673,875 | 6/1987 | Kjellqvist et al. | 324/207.25 |
| 4,682,445 | 7/1987 | Ono | 51/236 |
| 4,690,911 | 9/1987 | Nakada | 501/105 |
| 4,738,227 | 4/1988 | Kamo et al. | 123/23 |
| 4,820,980 | 4/1989 | Dodson-Edgars | 324/207.24 |
| 4,829,245 | 5/1989 | Echasseriau et al. | 324/207.15 X |
| 4,878,020 | 10/1989 | Karna et al. | 324/226 |
| 4,950,986 | 8/1990 | Guerrero | 324/207.19 |
| 5,016,343 | 5/1991 | Schutts | 324/207.15 X |
| 5,037,438 | 8/1991 | Davidson | 623/18 |
| 5,180,394 | 1/1993 | Davidson | 623/18 |
| 5,278,496 | 1/1994 | Dickmeyer et al. | 324/174 |
| 5,549,700 | 8/1996 | Graham et al. | 623/22 |
| 5,565,156 | 10/1996 | Ingelstrom | 264/60 |

FOREIGN PATENT DOCUMENTS

| | | |
|---|---|---|
| 841600 | 1/1969 | Canada. |
| 0 179 029 | 4/1986 | European Pat. Off.. |
| WO 89/02783 | 4/1989 | WIPO. |
| WO 93/01886 | 2/1993 | WIPO. |

Primary Examiner—Sandra L. O'Shea
Assistant Examiner—Jay M. Patidar
Attorney, Agent, or Firm—Chilton, Alix & Van Kirk

[57] ABSTRACT

The invention is a method and apparatus for calibrating a gap sensing probe (12) in a refiner having first (76) and second (80) grinding plates facing each other and supported by respective first and second plate holders, each grinding plate having a face (78, 82) defining a grinding gap (86). The gap measuring device, which is secured within one of the plates, includes a sensor probe (12) for measuring gap width data having a substantially cylindrical tip (14) with a flat frontal portion (16), an attached conical portion (18) and a longitudinal axis (20) therebetween. A cable (22) is electrically connected to the conical portion of the probe, for transmitting the gap width data. A protective sleeve (24) can be positioned around and contact the cylindrical tip, wherein the flat frontal portion of the tip is exposed through the sleeve. A substantially crucible-shaped ceramic housing (28) having a closed front (30), an open back (32) is provided, wherein the flat frontal portion of the tip abuts the front of the housing and the cable protrudes from the rear of the housing. A threaded mounting adapter (42) is situated around the housing and an adapter plug (60) is situated within the mounting adapter. The housing, the mounting adapter, and the adapter plug have flanges (38, 48, 68) and shoulders (52) which interact so as to prevent movement of the housing. In the preferred embodiment, the probe is calibrated from the rear of the housing by turning the probe by the threaded mounting adapter. The calibration can be completed without actually measuring the plate gap width by rotating the probe through threads which are of a known and predetermined width.

15 Claims, 3 Drawing Sheets

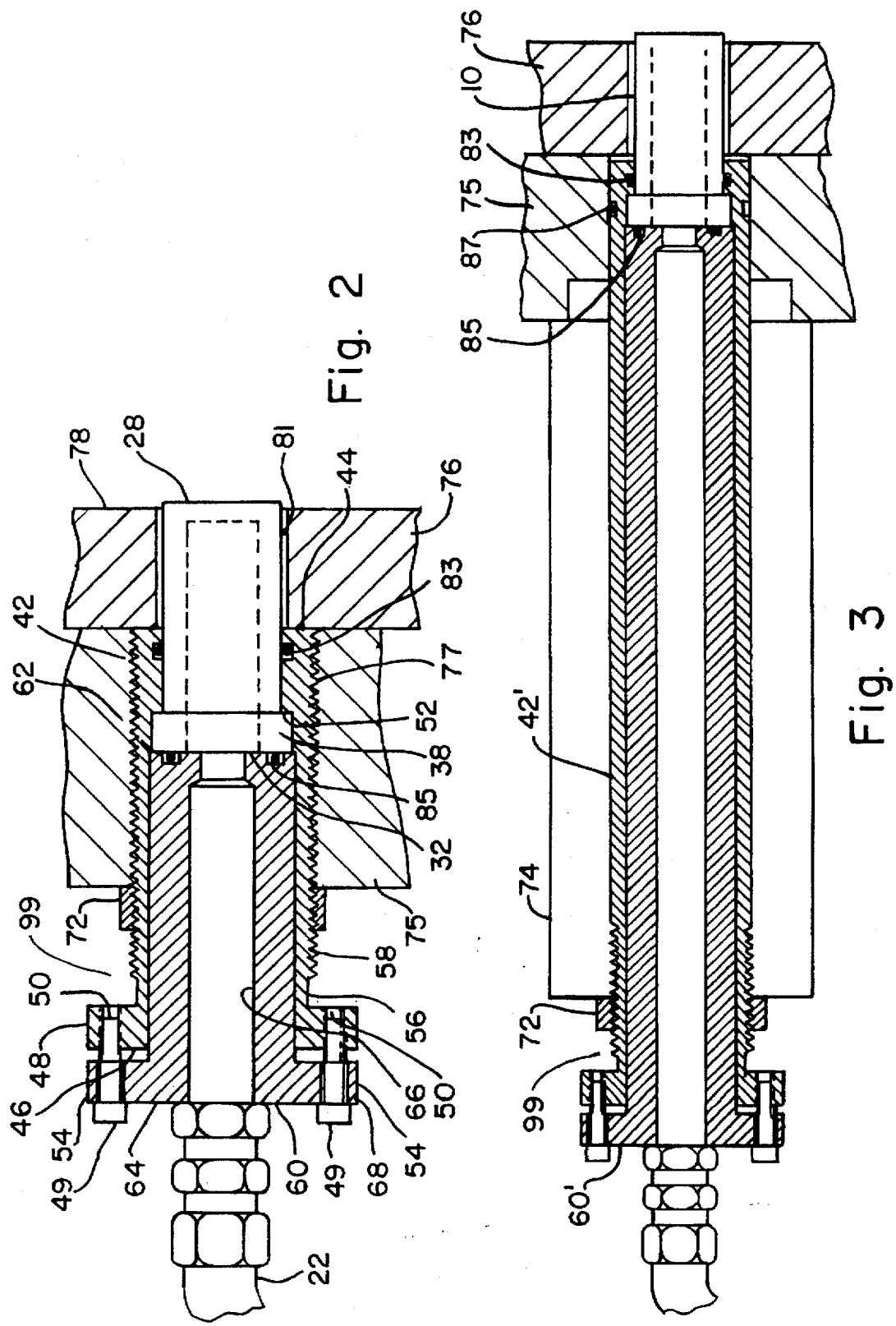

PROBE ASSEMBLY MOUNTING FOR A GRINDING MACHINE

BACKGROUND OF THE INVENTION

The present invention relates to devices used to measure a variable gap between two relatively rotating surfaces, and more particularly to devices used to measure and control the gap between refining surfaces in a wood pulp refining system.

The paper industry uses grinding machines, commonly known as refiners, to convert wood chips into wood pulp. These refiners have co-axially mounted rotating grinding plates with a narrow gap therebetween. Refiners are of several designs. The first has a stationary plate and a rotating plate. The second has a single double sided plate in between two stationary plates. A third has two rotating plates. Wood chips are introduced between the plates, where grooves in the grinding plates tear the wood fibers apart, finally converting the chips into pulp.

The gap between the rotating plates is very important. For example, the gap size and shape directly affects the quality and consistency of the wood pulp. The plate gap, which is measured in thousandths of an inch, must be uniformly maintained during the conversion process to ensure constant wood pulp quality.

This gap width is difficult to control for several reasons. First, the wood chips are very rough and tend to wear away the plate surface, thus increasing the gap size. If the gap becomes too large, the wood pulp becomes coarser. This results in inconsistent wood pulp quality. Second, if the plate gap is too small, the plates may clash in an undesirable fashion due to metal-on-metal contact.

Various probes have been invented which attempt to measure this plate gap to ensure optimal working conditions. One probe is disclosed in U.S. Pat. No. 4,820,980 to Dodson-Edgars. Dodson-Edgars discloses a method and apparatus for measuring the plate gap, tram, deflection, and wear of the rotating plates, wherein inductive sensors are mounted in a recessed inset. These sensors can measure this important data; however, these sensors are exposed to the harsh environment of the high temperature steam and chemicals, as well as contact by wood chips. Such sensors have tips which deteriorate and must be routinely replaced. The replaced tips must be accurately positioned and calibrated, but a drawback of the Dodson-Edgars probe is that its calibration is quite complicated. The calibration of this probe requires determining several coefficient values. This is time consuming, and, hence costly.

SUMMARY OF THE INVENTION

It is an object of the present invention to provide a gap-measuring device which does not wear away or deteriorate in the harsh environment of a wood pulp refiner.

It is a more particular object to provide a gap measuring device which can be calibrated without disassembly of the refiner. This is accomplished by selectively positioning the gap measuring device along a known thread width without the need to independently measure non-zero plate gap widths.

It is still a further object to provide a gap measuring device with a single-sized housing and varying-sized adapter components so that one device can be used in all sizes of refiner plates or plate holders.

These and other objects are accomplished with system and method embodiments of the invention in which a plate gap sensor is contained in a probe housing, which is supported by a mounting adapter. The mounting adapter and an adapter plug cooperate to securely hold the housing. The probe preferably includes a non-contacting eddy current displacement sensor, for measuring gap the width. The probe has a substantially cylindrical tip with a flat frontal portion. A cable is electrically connected to the sensor and transmits the gap width data to a remote location. A tubular sleeve is positioned around and contacts the cylindrical tip, leaving the flat frontal portion of the tip exposed through the sleeve. A sealing compound is packed around and contacts the sensor portion of the probe and is also packed around and contacts a portion of the cable. In other embodiments of the invention the sleeve can be eliminated and the sensor and cable sealed in a high temperature potting compound. The sensor can also be sealed from the environment by a mechanical cord grip arrangement between the cable and a housing. A substantially crucible-shaped ceramic housing, which has a closed front, an open back, and a longitudinal axis therebetween, encapsulates the sealing compound and the sleeve and has a passageway for the cable. The longitudinal axis of the housing coincides with the longitudinal axis of the sensor. The flat frontal portion of the tip abuts the front of the housing and the cable protrudes from the rear of the housing.

The housing has flanges at the back of the housing which project perpendicularly to the longitudinal axis of the housing. The mounting adapter has internal shoulders for receiving the flanges of the housing. The adapter shoulders cooperate with the housing flanges to prevent movement of the housing within the adapter. The mounting adapter has flanges at the back of the adapter which project perpendicularly to the longitudinal axis of the housing. The adapter plug is situated within the mounting adapter. The adapter plug receives a portion of the cable and contacts the back of the housing. The adapter plug has flanges at the rear which project perpendicularly to the longitudinal axis of the housing, wherein the flanges of the adapter plug and of the mounting adapter cooperate to prevent movement of the housing. Bolts secure the adapter plug and mounting adapter together so as to prevent movement therebetween. The plug can also be threaded into the back of the mounting adapter to avoid movement.

The gap sensing probe is calibrated in a refiner from the rear of the housing in the following manner. The probe is installed in a bore from the rear side of one of the plates, such as the stator plate, for example. The probe is secured in the stator plate by tightening locking means carried by the adapter. The refiner plates are moved until the stator plate face contacts the rotor plate face to eliminate the gap. Then the probe is unlocked and moved within the stator plate until the tip contacts the rotor plate. An electronic measurement is performed and the signal value electronically stored as to set a probe zero position for calibration purposes. The probe is withdrawn a first predetermined distance corresponding to the maximum accurate gap reading capability of the probe. In the preferred embodiment, the probe is turned through threads in the mounting adapter, wherein the threads are of a known and predetermined width. Then the locking means is secured. Another electronic measurement is performed and electronically stored so as to set the span. The probe is again moved within the stator plate until the tip contacts the rotor plate. Afterwards, the probe is withdrawn a second predetermined distance. The locking means is secured and the gap measurement is read. Calibration is completed by this confirmation that the measured gap equals the second predetermined distance. Before refiner operation begins the tip is recessed approximately 0.03 to 0.05 inches from the face of the stator plate, and the refiner plates are opened by moving the stator plate a predetermined distance to create a nominal operating gap such that the sum of the nominal gap and the second predetermined distance is less than the first predetermined distance.

In a refiner design with no stator plate the probe could be mounted in one of the rotor plates. However, it is easier to employ two probes that "look" at the backs of the rotor plate holders, rather than being attached therein. The procedure is essentially the same to calibrate the probes, but with an additional logic step to subtract distances from the two probes to the determine the gap between the plates.

BRIEF DESCRIPTION OF THE DRAWINGS

A detailed description of the preferred embodiment of the invention is set forth below, with reference to the accompanying drawings, in which:

FIG. 2 is a schematic view of the gap measuring device, shown in FIG. 1, with an abutting adapter plug which is situated within a mounting adapter, to be collectively referred to as a probe assembly;

FIG. 3 is a schematic view of the probe assembly, shown in FIG. 2, situated within a movable plate holder key;

DETAILED DESCRIPTION OF THE PREFERRED EMBODIMENT

Figure 1:
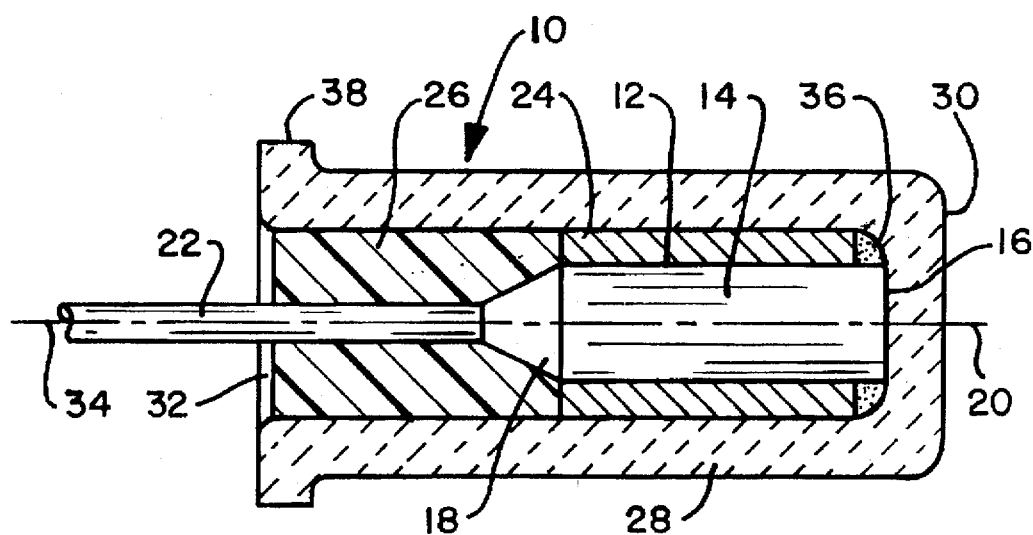
FIG. 1 is a cross-sectional view of a gap measuring device, or probe, constructed in accordance with the present invention.

Referring to FIG. 1, the preferred embodiment of a probe assembly is shown and generally designated by the reference numeral 10. In particular, the probe has a non-contacting displacement sensing means 12, such as a temperature-compensated eddy current displacement transducer of the type available from HBM Inc., Marlboro, Mass. The main parts of the transducer consist of a probe, a matched extension cable, and an oscillator. The oscillator produces a high frequency carrier signal that creates a electro-magnetic field around the probe's coil. Any electrically conductive body entering this field dampens the field's amplitude; from this effect the distance of the body from the coil can be determined. The usable displacement range of a transducer depends on the diameter of the transducer's coil. The measurement values are free from other influences such as vacuum, oil, gas and other non-conductive, non-magnetic media.

This probe 12 has a substantially cylindrical tip 14 with a flat frontal portion 16, an attached conical portion 18, and a longitudinal axis 20 therebetween. Any suitable transmitting means 22, such as a cable, is electrically connected to the conical portion 18 of the displacement probe 12 and transmits the gap width data to a remote location (not shown). A tubular, sleeve 24 is positioned around and contacts the cylindrical tip 14; however, the flat frontal portion 16 of the tip 14 is exposed through the sleeve 24. A sealing compound 26 is positioned around and contacts the conical portion 18 of the probe 12 and is also positioned around and contacts a portion of the cable 22.

The flat frontal portion 16 of the cylindrical tip 14 abuts a substantially crucible-shaped housing 28 having a closed front 30, an open back 32, and a longitudinal axis 34 therebetween. The longitudinal axis 34 of the housing coincides with the longitudinal axis 20 of the probe 12. The housing encapsulates the sealing compound 26 and the sleeve 24 and has a passageway for the cable 22. In the preferred embodiment, the housing 28 is made of ceramic, preferably a zirconium based ceramic, and particularly the zirconium ceramic manufactured and marketed by KYOCERA of Kyoto, Japan. A zirconium based ceramic is preferred because of its machinability, extreme hardness and resistance to chipping, cracking, and shattering relative to alumina ceramics. Boron-nitride ceramic has an even higher resistance to abrasion, but is less well known, harder to machine, and more expensive. Ceramics are non-conductive and non-magnetic, so as not to effect the electrical flux associated with the eddy currents of the sensor. This maintains linearity and accuracy. An adhesive 36 connects the exposed frontal portion of the probe tip to the housing 28. In another embodiment the frontal portion 16 of probe 12 can be mechanically pressed against the housing 28 by a spring and teflon bushing or other mechanical means. The housing 28 further has an annular or other flange means 38, located at the back 32 of the housing and projecting perpendicularly to the longitudinal axis of the housing.

The probe assembly 10 is situated in a mounting adapter 42 as shown in FIG. 2. This adapter 42 has a front 44 and a rear 46. Annular or similar flange means 48 project perpendicularly to the longitudinal axis 34 of the housing 28. The adapter 42 also has a means, such as shoulders 52 for receiving the flange 38 of the housing 28. Housing flange 38 cooperates with adapter shoulder 52 to prevent movement of the housing 28 within the adapter 42. The mounting adapter 42 further has an outside rear portion 56 along which a series of threads 58 are provided. In the preferred embodiment, the threads 58 are cut to have twelve threads per inch.

An adapter plug 60 is situated within the mounting adapter 42. The adapter plug has a front 62, a rear 64, and a means 66, such as a passageway, for receiving the cable 22. The front of the adapter plug contacts the back 32 of the housing. The adapter plug also has flange means, such as annular flange 68, which is located at the rear of the housing and which project perpendicularly to the longitudinal axis of the housing. The flange 68 of the adapter plug 60 and the flange 48 of the mounting adapter can be joined together by bolts 49 through bores 50,54 to prevent movement of the housing 28. The adapter plug 60 and the mounting adapter 42 may also be threaded together in another embodiment of the invention. Any suitable locking means such as a locknut 72, can be provided along the threads 58 of the mounting adapter 42 so as to secure the detector unit 99, to the plate holder 75 of a refiner. The detector unit 99 is comprised of probe assembly 10, mounting adapter 42 and adapter plug 60.

The plate holder 75 has a threaded bore 77 which is coaxially aligned with a smaller through bore 81 on the grinding plate 76. The threads 58 on mounting adapter 42 engaged threads in bore 77, and the axial position is locked by locknut 72 bearing against the plate holder 75. This sets the position of the probe tip 14 as recessed relative to the grinding surface 78 of plate 76. O-rings 83,85 or similar seals are provided between the adapter 42 and housing 28 of probe assembly 10, and between the plug and the back 32 of probe assembly 10, thereby preventing material in the recess 81 from contaminating the electrical cable 22 or entering the probe assembly 10 from the rear 32. In an alternative embodiment, the O-ring 85 can seal sufficiently well to eliminate the sealing compound 26.

FIG. 3 shows a variation by which detector unit 99 is situated with a movable plate holder key 74, can be installed in a plate holder having a mating key way (not shown). An elongated adapter 42' and plug 60' function in the same manner as 42,60 of FIG. 2. An additional seal 87 may be provided between the adapter 42' and the plate holder 75 to keep the process from contaminating the area between the adapter 42' and the key 74. The advantage of plate holder key 74 is that many different types of detector units 99 can be easily interchanged for different sensing missions. Each detector unit 99 need not have an independent or different sized mounting position, saving machining costs and reducing complexity.

Figure 4:
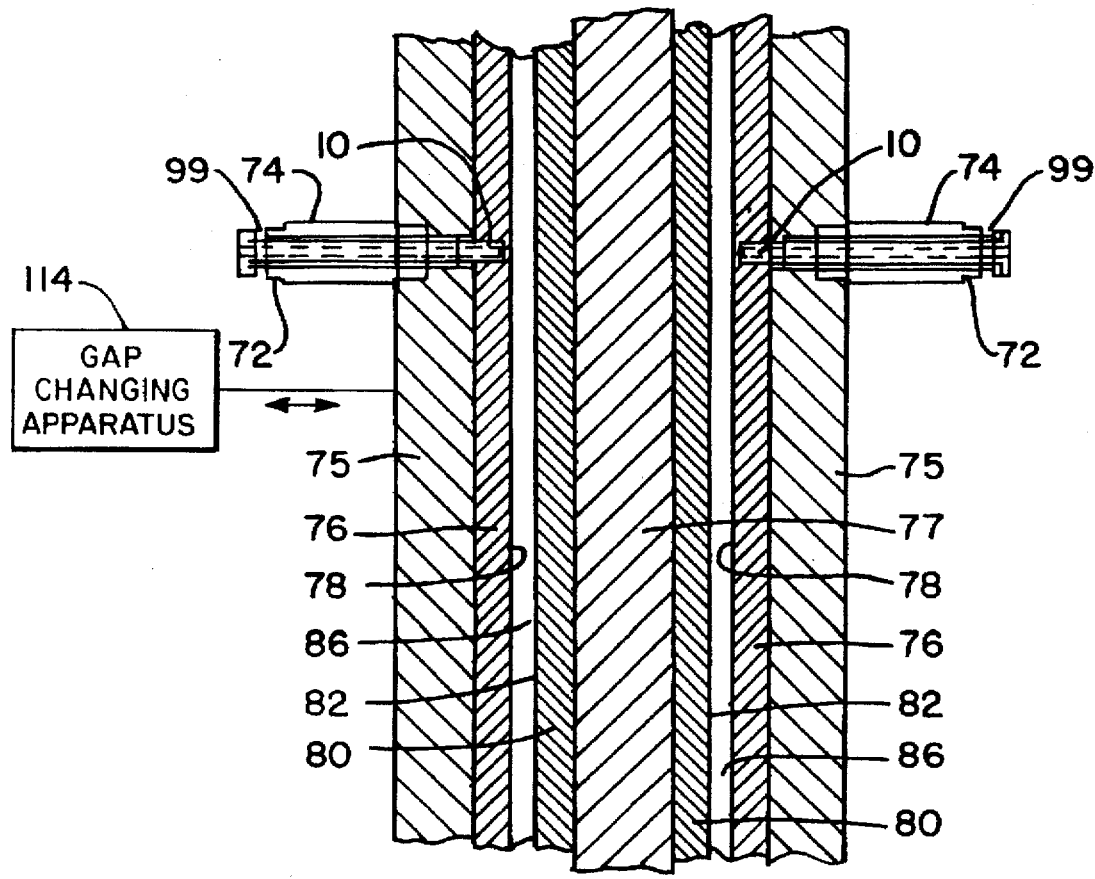
FIG. 4 is a schematic view in partial cross-section, showing two probe assemblies, substantially identical to the one shown in FIG. 3, each mounted in a stationary plate arrangement of a Twin Refiner™.

FIG. 4 shows two detector units 99 mounted within a stationary plate 76 having a grinding surface 78. Each plate is attached to a plate holder 75. Two rotating plates 80 carried by a rotating central disc 77 define two grinding surfaces 82. The grinding surfaces 82 face a respective grinding surface 78 of the stationary plates 76 creating gaps 86 having a width therebetween. Each detector unit 99 is secured within a plate holder key 74, and the key 74 into a plate holder 75.

In the preferred embodiment, the probe 12 is calibrated from the rear of plate holder 75 and in the following manner. The detector unit 99 is installed into one of the plates, such as the stationary plate 76, and secured therein by tightening the locknut 72. One of the refiner plates, such as 80, is moved until the grinding surfaces 78, 82, respectively, contact, thereby eliminating any gap 86 therebetween. Then the locknut is loosened. The detector unit 99 is moved within the stationary plate 76 until the tip of the housing 28 contacts the opposite plate surface 82. A measurement is performed and the signal value electronically recorded and stored. This establishes a probe zero distance signal, and corresponds to the minimum gap (zero gap) that can occur during operation of the refiner if the grinding surface 78 has not worn away the initial recess of the probe tip. Afterwards the probe is withdrawn a first predetermined distance. In the preferred embodiment, the probe assembly 10 is withdrawn by turning the detector unit 99 counter-clockwise a predetermined number of turns, for example two turns, over threads that are of a known and predetermined width. After the probe assembly 10 is withdrawn the first distance, the locknut 72 is secured. Then, another measurement is performed and another signal value recorded so as to set a probe span. The probe assembly 10 is then moved within the stationary plate until the tip of the housing 28 contacts the plate 80. The probe assembly is withdrawn a second predetermined distance by turning the detector unit 99. In the preferred embodiment, the predetermined second distance is established when the detector unit 99 is turned one-half turn counter-clockwise. The locknut 72 is again secured. Then the probe assembly 10 reads the gap 86 measurement. This gap measurement must equal the second predetermined distance to assure that calibration has been completed.

The calibration is correctly completed, and the tip is recessed between approximately 0.03 and 0.05 inches from the grinding surface 78 of the stationary plate 76, in the preferred embodiment. Afterwards, the refiner plates 76, 80 are opened by moving the plate holder 75 using a gap changing apparatus 114 and/or disc 77 a third predetermined distance to create a nominal operating gap 86 such that the sum of the nominal gap 86 and the second predetermined distance is less than the first predetermined distance.

In operation, the detector unit 99 is appropriately mounted and calibrated. Then, the rotating plate, driven by a driving shaft (not shown) begins rotating. Wood chips (not shown) are fed into the refiner and ultimately pass through the gap 86. Processed wood pulp (not shown) exits the refiner.

The probe assembly 10 monitors the plate system by continuously measuring the gap 86 width. The probe 12 projects an electromagnetic field toward the opposing plate to obtain a continuous read of the gap width. This gap width data is electrically transmitted to an amplifier located in a control box (not shown) in a remote location. The gap data is shown on the control box display screen. Digitally-based system electronics allow the system to be adjusted for different plate patterns, if required. Gap data is converted into an analog signal that interfaces with the plate adjustment mechanism to automatically control plate position and to maintain the desired plate gap.

Because the probe 12 accurately measures plate wear, indicating when the plates have become too worn to be of good use, the probe 12 can indicate when the plates need to be changed—without actual human inspection. As the plates become worn due to the coarse wood chips, the probe measures this incremental change. Then, from a remote location, the plates are moved accordingly.

Because the probe assembly is recessed below the refiner plate surface, the probe is not in direct contact with the fibers being refined because of the recess in the grinding plate 76 and wear resistant probe housing 28. Furthermore, the probe assembly will not come into contact with the opposing refiner plate, should the plates clash. As a result, the probe assembly sustains practically no wear, so it maintains its reliability and accuracy, while reducing system maintenance and replacement costs.

Figure 5:
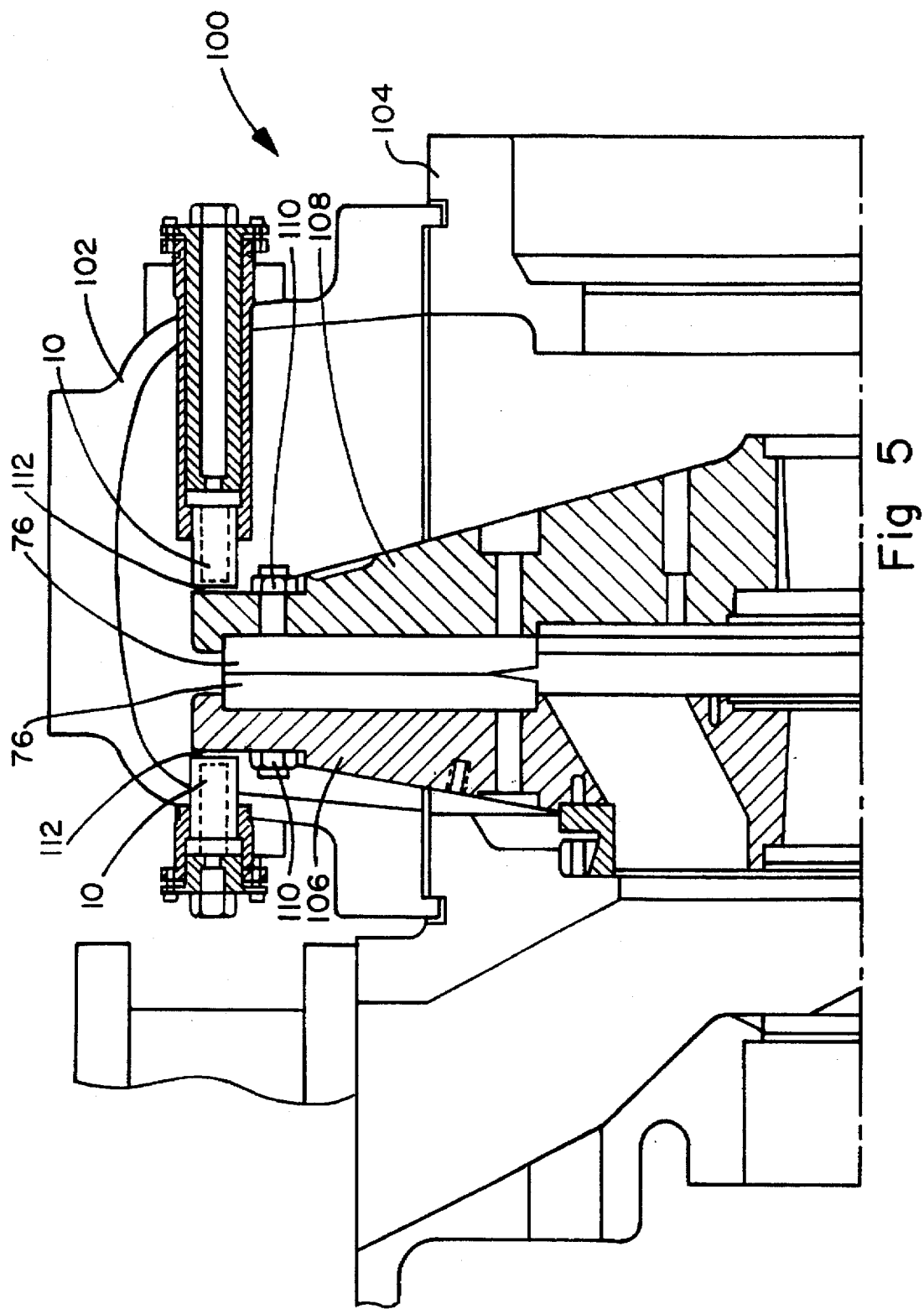
FIG. 5 is a partial cross-section view of a double rotating disk refiner with two probe assemblies mounted behind the disks.

FIG. 5 shows a partial cross-section of a two rotating disk refiner 100. The refiner 100 has a upper body 102 and a lower body 104. Located within the refiner 100 are feed end rotating disk 106 and control end rotating disk 108. Mounted to the disks 106,108 are plates 76 by bolts 110. Two detector units 99, are located in the upper body 102. The probe assemblies 10 are mounted behind the disks 106,108. A gap 112 is defined between each probe assembly 10 and each disk 106,108. The probes 12 are calibrated in the same manner as installed in a stationary disk. The plates 76 are brought into contact, and the probe assemblies 10 are brought into contact with the disks 106,108. The same calibration procedure is then followed as before, of moving the detector units 99. The detector units 99 are connected to an electronic system (not shown) that can perform the mathematics to determine the gap between the plates from the information of the gap between the plates 106,108 and the probe assemblies 10.

It should thus be appreciated that the apparatus described herein is well adapted to accomplish the objective of providing a housing for a gap sensor probe so as to protect the probe from the harsh environment of a pulp wood refinery by placing the probe within a wear resistant probe assembly. The entire detector unit is well adapted to provide an easy method to calibrate the probe. Variations of the particular components and equipment described herein may be substituted without departing from the scope of the invention as set forth in the claims. The probe may be used in single disc, Twin™ disc, and double disc refiners, as well as other types of similar machinery where a gap measurement is required.

We claim:

1. A gap measuring probe assembly comprising:
   a probe means comprising an eddy current detector for generating a signal indicative of a gap;
   a non-metallic, non-magnetic zirconium ceramic wear resistant housing around said probe means;

a mounting adapter having a cylindrical shape and defining a cylindrical through bore, said probe assembly being positioned in said bore and having a forward end projecting from said adapter and a back end retained in said bore;

an adapter plug having a cylindrical shape sufficiently small to fit in the bore of said mounting adapter and abut the back end of said probe assembly; and securing means selectively engageable between the mounting adapter and adapter plug for preventing motion between the mounting adapter and the adapter plug and thereby selectively fixing said probe assembly by mechanical force in said bore.

2. A gap sensing probe assembly in a refiner having first and second grinding plates facing each other and supported by respective first and second plate holders, each grinding plate having a face defining one side of a grinding gap, comprising:

a. a bore passing through the first plate holder and the first grinding plate;

b. a probe assembly defining a first end and a second end, and having a displacement sensing tip surrounded by a non-metallic non-magnetic, wear resistant ceramic housing at the first end and means at the second end for securing the probe assembly to and displacing the probe assembly in the first plate holder;

c. means for locking the probe assembly as secured at a particular position in the first plate holder; and d. a means for performing a measurement and recording a signal value commensurate with the distance between the top and the second grinding plate.

3. The gap sensing probe of claim 2, wherein the bore of the first plate holder has threads and the means for securing the probe includes threads on the probe assembly secured to the threads in the bore of the first plate holder.

4. The gap sensing probe of claim 2, wherein during operation of the refiner the tip is recessed between approximately 0.03 and 0.05 inches from the face of the first grinding plate.

5. A refiner comprising:

a first and a second grinding surface at least one grinding surface being rotatable;

a gap between the first and second grinding surfaces;

a means for changing the gap between the first and second grinding surfaces;

a detector unit operatively associated with one of the grinding surfaces and comprising a wear resistant non-metallic and non-magnetic housing and a probe means within the housing for generating a signal indicative of changes in the gap; and a means for moving the detector unit a known distance from a grinding surface without changing said gap.

6. The refiner of claim 5 wherein the means for moving the detector unit are threads of a known number per distance.

7. In a wood pulp refiner, a gap measuring arrangement comprising:

a. a rotating plate having a grinding surface;

b. a stationary plate having front and rear sides, with a second grinding surface on the front side and plate rear surface on the rear side, the second grinding surface facing the grinding surface of the rotating plate, creating a gap having a width therebetween;

c. a sensing means for measuring gap width data, the sensing means having a tip with a frontal portion and a back portion;

d. a transmitting means, electrically connected to the back portion of the sensing means, for transmitting the gap width data;

e. a non-metallic, non-magnetic wear resistant ceramic housing within which the sensing means tip and the connection of the tip to the transmitting means are encapsulated; and f. wherein the housing is mounted from the plate rear surface through an opening in the stationary plate so as to be recessed relative to the stationary plate grinding surface and selectively removable through said plate rear surface.

8. The gap measuring device of claim 7, wherein the housing is recessed in a substantially cylindrical bore that extends through the stationary plate and through the grinding surface of the stationary plate.

9. The gap measuring device of claim 7, further comprising a locking means for securing the housing and the stationary plate together so as to prevent movement therebetween.

10. A non-contacting gap measuring device for mounting on one of two opposed plates defining a gap therebetween, comprising:

a sensing means for eddy current measuring of gap width data;

transmitting means electrically connected to said sensing means for transmitting said gap width data;

a non-metallic, non-magnetic wear resistant ceramic housing having a longitudinal axis and a housing flange extending perpendicularly to the longitudinal axis of the housing, said housing encapsulating said sensing means and partially encapsulating said transmitting means;

a mounting adapter having a front portion, a rear portion, and defining a longitudinal stepped through bore having a shoulder, said housing positionable in said bore and extending from said bore at said first end, said housing flange engagable with said shoulder of said stepped bore;

an adaptor plug positionable in said stepped bore and engageable with said housing; and securing means for engaging said mounting adaptor to said adapter plug wherein said adapter plug is selectively releasably urged against said housing and thereby said housing flange is urged against said shoulder.

11. The gap measuring device of claim 10 wherein said mounting adapter has an adapter flange extending perpendicular to said longitudinal axis at said second portion, and said adapter plug has a plug flange extending perpendicularly to said longitudinal axis, and said securing means secures said plug flange and said adapter flange together.

12. The gap measuring device of claim 11 wherein said plug flange defines bolt openings and said securing means has bolts extending through said bolt openings and threadably engaging said adapter flange.

13. The gap measuring device of claim 10 wherein the mounting adaptor has a series of external threads.

14. The gap measuring device of claim 10 wherein the ceramic housing is made of a ceramic containing zirconium.

15. The gap measuring device of claim 10 wherein said mounting adapter, adapter plug and housing are generally cylindrical.

* * * * *